United States Patent [19]
Loose et al.

[11] 4,277,037
[45] Jul. 7, 1981

[54] LOCK BAR RELEASE FOR INERTIA LOCKING SEAT BELT RETRACTOR

[75] Inventors: Richard D. Loose, Birmingham; Harley L. Kapanka, Utica, both of Mich.

[73] Assignee: General Motors Corporation, Detroit, Mich.

[21] Appl. No.: 116,836

[22] Filed: Jan. 30, 1980

[51] Int. Cl.³ .................. A62B 35/02; B65H 75/48
[52] U.S. Cl. .................. 242/107.4 A; 280/806
[58] Field of Search .......... 242/107.4 R–107.4 E; 280/801–808; 297/474–480

[56] References Cited

U.S. PATENT DOCUMENTS

| | | | |
|---|---|---|---|
| 3,312,451 | 4/1967 | Davis | 242/107.4 R X |
| 3,771,814 | 11/1973 | Hahn | 242/107.4 R X |
| 4,065,070 | 12/1977 | Pilarski et al. | 242/107.4 A |
| 4,090,735 | 5/1978 | Czernakowski | 242/107.4 A X |

Primary Examiner—John M. Jillions
Attorney, Agent, or Firm—Charles E. Leahy

[57] ABSTRACT

A seat belt retractor includes a housing having laterally spaced first and second housing walls and a belt reel journaled for rotation by a reel shaft extending between the housing walls. A ratchet plate is attached to each end of the reel. A lock bar extends between the housing side walls and has locking teeth at the ends thereof adapted for selective engagement with the ratchet plates upon pivotal movement of the lock bar toward the ratchet plate. A release member is provided to forcibly disengage the lock bar from engagement with the ratchet plates and includes laterally spaced first and second abutment portions which respectively extend between the ratchet plate and the adjacent housing wall to overlie the locking teeth of the lock bar in spaced relation therefrom. A manually actuated release lever moves the release member into simultaneous engagement with the locking teeth at both ends of the lock bar to forcibly disengage the lock bar from engagement with the ratchet plates to permit belt unwinding rotation.

3 Claims, 4 Drawing Figures

LOCK BAR RELEASE FOR INERTIA LOCKING SEAT BELT RETRACTOR

The invention relates to a seat belt retractor of the type in which an inertia sensing member pivots a lock bar into engagement with a belt reel and more particularly provides mechanism by which the lock bar may be manually disengaged from the reel.

BACKGROUND OF THE INVENTION

Vehicle occupant restraint belt retractors have heretofore been provided with an inertia responsive pendulum or the like for pivoting a lock bar into engagement with a pair of toothed ratched plates attached to the ends of the belt reel so that the length of a restraint belt extending from the reel is fixed to restrain an occupant upon the vehicle seat. The locking engagement between the lock bar and the ratchet plate teeth is effectively maintained for as long as an occupant restraining load is imposed on the belt even though the inertia stimulus is terminated. When the load is removed from the belt, a slight belt rewinding rotation by a reel windup spring permits gravity to pivot the lock bar out of engagement from the ratchet plates to permit subsequent belt unwinding.

It is known to use the aforedescribed seat belt retractor in a seat belt system of the type having one end of the belt connected to the vehicle door so that the belt will be automatically moved to an unrestraining position when the door is opened and returned to the restraining position when the door is closed. It has been recognized as desirable to provide a buckle in the belt so that the belt can be disconnected to permit opening movement of the door. It has also been recognized as desirable to provide a handle which is manually operable to forcibly disengage the lock bar from the ratchet plates so that the belt may be unwound.

One arrangement for effecting disengagement of the lock bar is to pivotally mount the lock bar on the retractor housing via a collapsible support means normally supporting the lock bar in proximity with the ratchet plates and having a collapsed condition to bodily withdraw the lock bar from engagement with the ratchet plates. Copending patent application Ser. No. 044,753, now U.S. Pat. No. 4,218,033, Bernard J. Finn et al, filed June 1, 1979, is an example of such a lock bar release device.

U.S. Pat. No. 3,771,814, issued Nov. 13, 1973 to Hahn, discloses a retractor wherein a manually operable handle is connected to one end of the lock bar adjacent one of the ratchet plates and is operable to manually pivot the lock bar out of engagement with both of the ratchet plates. It is characteristic of this lock bar release arrangement that the lock bar must have a high level of strength to resist twisting thereof by the high level of torque necessary to disengage the lock bar from the ratchet plates during imposition of a relatively large occupant restraining load on the reel via the restraint belt. Furthermore, the pivotal mount between the lock bar and the retractor frame must be configured to provide a fulcrum for supporting the lock bar for pivotal movement under imposition of occupant restraining load thereon.

It is also known in seat belt retractors to mount the lock bar on the retractor via a plastic pendulum support member as disclosed in U.S. Pat. No. 4,129,267, issued Dec. 12, 1978 to Degras et al, and assigned to the assignee of this invention. The plastic pendulum support consistently and accurately locates the lock bar relative the axis of reel rotation and yields to permit load sustaining engagement of the lock bar with the retractor housing. A disadvantage of the plastic pendulum support member is that the lock bar fulcrum provided thereby does not have sufficient strength to support the lock bar for pivotal movement by a manually operable handle attached to one end thereof.

BRIEF SUMMARY OF THE INVENTION

A seat belt retractor according to the invention includes a housing having laterally spaced first and second housing walls and a belt reel journaled for rotation by a reel shaft extending between the housing walls. A ratchet plate is attached to each end of the reel. A lock bar extends between the housing side walls and has locking teeth at the ends thereof adapted for selective engagement with the ratchet plates upon pivotal movement of the lock bar toward the ratchet plate. A release member is provided to forcibly disengage the lock bar from engagement with the ratchet plates and includes laterally spaced first and second abutment portions which respectively extend between the ratchet plate and the adjacent housing wall to overlie the locking teeth of the lock bar in spaced relation therefrom. A manually actuated release lever moves the release member into simultaneous engagement with the locking teeth at both ends of the lock bar to forcibly disengage the lock bar from engagement with the ratchet plates to permit belt unwinding rotation.

The invention is particularly suited to a retractor having a pair of reels mounted side-by-side on a common housing and adapted to wind and unwind seat belts associated respectively with the driver seat and passenger seat. The release member includes a first pair of first and second abutment portions adapted to overlie the locking teeth of the lock bar associated with one of the reels and a second pair of first and second abutment portions adapted to overlie the locking teeth of the lock bar associated with the other reel. The manually actuated release lever means extends between the first and second reels.

One object, feature and advantage of the invention resides in the provision of a lock bar release member adapted to simultaneously apply a lock bar release effort to both ends of a lock bar closely adjacent the ratchet teeth so that the torque loads applied to the lock bar are minimized.

Another object, feature and advantage of the invention resides in the provision of manually operated lock bar release member adapted for interposition within a lateral spacing between a ratchet plate and the adjacent housing side wall so that the disengaging effort is applied to the lock bar closely adjacent the point of contact between the lock bar and the ratchet plate.

Another object, feature and advantage of the invention resides in the provision of a manually actuable release lever extending between side-by-side mounted belt reels to simultaneously operate a release member having abutment portions adapted to overlie lock bars associated with both reels.

These and other objects, features and advantages of the invention will become apparent upon consideration of the specification and the appended drawings in which.

DESCRIPTION OF THE PREFERRED EMBODIMENT

Figure 1:
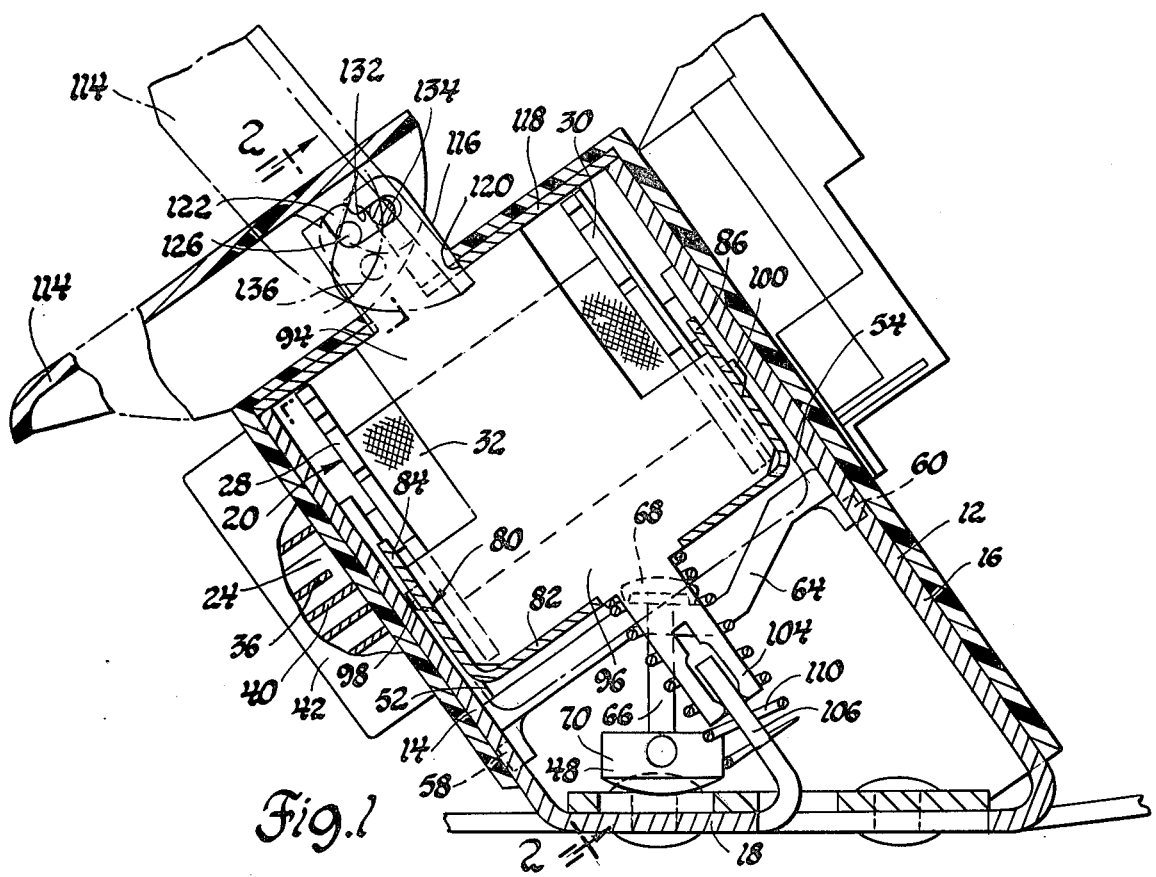
FIG. 1 is a side elevation view of a seat belt retractor embodying the invention.
Figure 2:
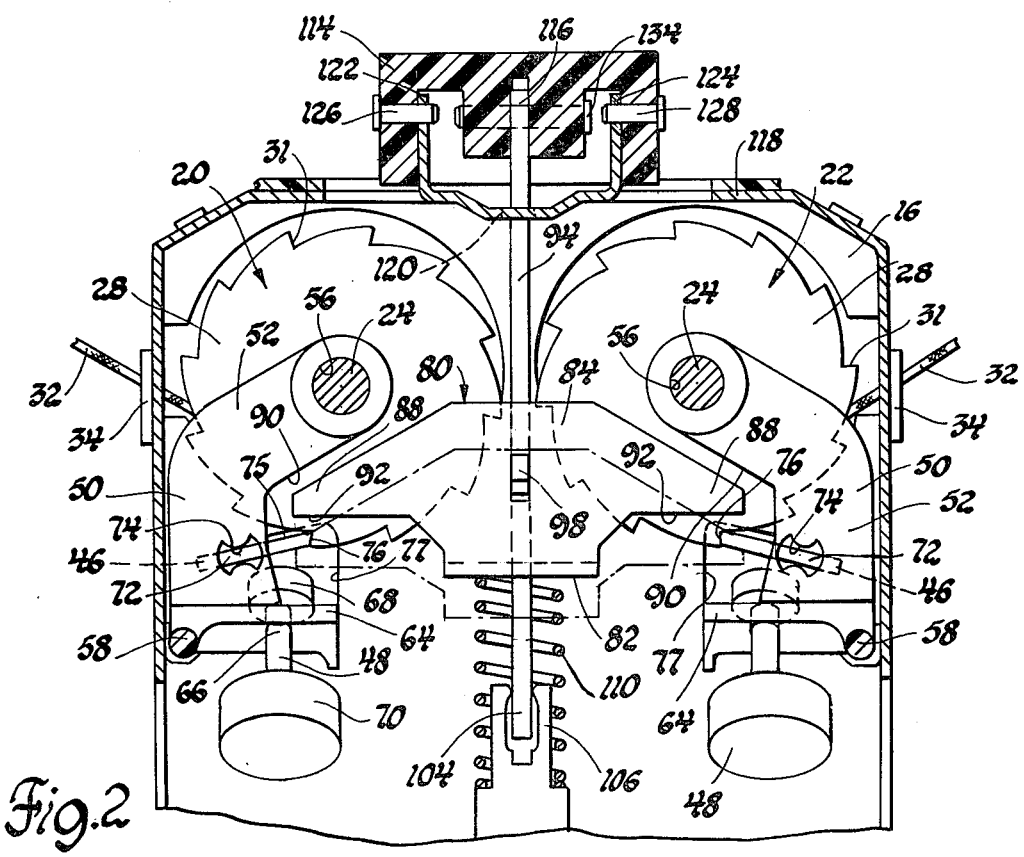
FIG. 2 is a sectional view taken in the direction of arrows 2—2 of FIG. 1.

Referring to FIGS. 1 and 2 of the drawings, there is shown a seat belt retractor having a pair of side-by-side mounted belt reels. The reels share a common housing which is suitably mounted on the transmission tunnel of a vehicle body and respectively wind and unwind shoulder belts having their outboard ends mounted respectively on the driver and passenger door so that the belts are automatically moved between restraining and unrestraining positions by movement of the doors.

The retractor housing 12 includes a pair of spaced apart housing walls 14 and 16 which are joined by an integral base portion 18. Belt reels generally designated 20 and 22 are rotatably mounted between the housing walls 14 and 16 by reel shafts 24. Since the reels 20 and 22 and the locking mechanism associated therewith are identical for both reels 20 and 22, like reference numerals are assigned to the identical components.

Reel 20 includes first and second ratchet plates 28 and 30 which are attached to the reel shaft 24 in closely spaced relation from the housing walls 14 and 16. The ratchet plates have circumferentially spaced teeth 31 facing in the belt unwinding direction. The restraint belt 32 is attached to the reel shaft 24 between the ratchet plates 28 and 30 and extends outwardly from the retractor through a plastic belt guide 34 for positioning about the seated occupant.

The left-hand end of the reel shaft 24 as viewed in FIG. 1 extends outwardly through the adjacent housing wall 14 and has a slot 36 which receives the inner end of a spiral spring 40. The outer end of the spiral spring 40, not shown, is suitably fixed to a spring cover 42 so that the reel 20 is normally biased in the belt winding direction to store the belt 32 on the reel and pull the belt taut against the seated occupant.

A locking mechanism for locking the reel 20 against belt unwinding rotation includes a lock bar 46 and a pendulum assembly 48 which are mounted by a support member 50. The support member 50 is preferably of injection molded resilient plastic and includes laterally spaced side walls 52 and 54 which are juxtaposed with the housing walls 14 and 16. The upper ends of the side walls 52 and 54 are interposed between the housing walls 14 and 16 and the adjacent ratchet plates 28 and 30 and have apertures 56 which receive the ends of the reel shaft 24 to mount the support member 50 relative the reel shaft 24. Projections 58 and 60 extend laterally from the side walls 52 and 54 into mating apertures of the housing walls 14 and 16 to fix the support member 50 against rotation about the reel shaft 24. The support member 50 also includes a pendulum support portion 64 which is integral with the side walls 52 and 54 and bridges the lateral space therebetween.

The pendulum assembly 48 has a stem 66 which extends through an aperture in the pendulum support portion 64 and mushrooms outwardly to provide a control head 68. A weight 70 is staked to the lower end of the stem 66. The pendulum control head 68 is engaged by the lock bar 46 and supports the lock bar at a pivotal location spaced from the ratchet teeth 31 as will be described hereinafter.

As best seen in FIG. 2, the lock bar 46 is a generally planar sheet metal stamping having pivot ears 72 extending from the ends thereof into bow tie shaped apertures 74 provided in the support member side walls 52 and 54. The lock bar 46 also has laterally spaced locking teeth 76 at each end thereof which are aligned with the ratchet teeth 31 of ratchet plate 28 and 30 for selective engagement therewith upon upward pivotal movement of the lock bar 46. The lock bar 46 normally rests upon the control head 68 of the pendulum assembly 48 to establish the lock bar locking teeth 76 in a normal spaced relation from the ratchet teeth 31 of ratchet plates 28 and 30.

A predetermined level of vehicle deceleration causes the pendulum assembly 48 to swing from the normal vertically depending position of FIGS. 1 and 2 to an inclined position causing the pendulum control head 68 to pivot and thereby raise the lock bar 46 upwardly to the position of FIG. 2 in which the lock bar locking teeth 76 engage the ratchet teeth 31 of both ratchet plates 28 and 30. Rotation of the belt reel 20 in the unwinding direction by the imposition of occupant restraining load on the belt 32 induces bodily tangential movement of the lock bar 46 as permitted by the yielding of the plastic pendulum support member 50. The lock bar 46 has laterally projecting abutments 75 which extend through aligned apertures 77 of the housng walls 14 and 16. The lock bar abutments 75 engage the wall of the aperture 77 to limit the tangential motion of the lock bar 46 and thereby block further unwinding rotation of the ratchet plates 28 and 30 and the belt reels 20 and 22.

A more complete description of the pendulum support 50, the lock bar 46, and pendulum assembly 48, may be had by reference to U.S. Pat. No. 4,129,267, issued Dec. 12, 1978 to James C. Degras et al and assigned to the assignee of this invention.

Upon termination of the vehicle deceleration condition, the pendulum assembly 48 will return from the tilted position to the normal position of FIGS. 1 and 2. Assuming that there is no occupant restraining load remaining on the belt 32, the lock bar 46 will return from the engaged position of FIG. 2 to the normal disengaged position resting upon the pendulum control head 68. However, if the occupant's weight remains on the belt 32, the locking interengagement between the lock bar 46 and the ratchet teeth 31 will retain the lock bar 46 in the ratchet wheel engaging position whether or not pendulum assembly 48 may have returned to the normal vertical position. Furthermore, the vehicle may come to rest at an unnatural attitude in which the force of gravity tilts the pendulum assembly 48 and thereby causes the lock bar 46 to be engaged or remain in engagement with the ratchet teeth 31 even though there may be no occupant restraining load acting on the belt 32.

A lock bar release mechanism is provided by which the lock bar 46 may be forcibly disengaged from engagement with the ratchet teeth 31. Referring to FIGS. 1 and 2, it is seen that a release member 80 is comprised of a sheet metal stamping and includes a base portion 82 which spans the distance between housing walls 14 and 16 and upturned walls 84 and 86 which are interposed between the housing walls 14 and 16 and the adjacent ratchet plates 28 and 30. As best seen in FIG. 2, the wall 84 includes abutment portions 88 which extend into clearance spaces 90 of the support members 50 and has downwardly facing abutment faces 92 which overlie the lock bars 46 directly above the locking teeth 76 thereof and adjacent the ratchet plates 28. The release member wall 86 includes identical abutment portions 88 which extend into overlying relation which the other ends of the lock bars 46 adjacent the ratchet plates 28.

The lock bar release mechanism also includes a plunger 94 comprised of a sheet metal stamping which is situated in the space between the reels 20 and 22. The plunger 94 includes a central portion 96 which extends the full width between the release member walls 84 and 86 and has locking tabs 98 and 100 which extend laterally therefrom through mating apertures of the release member walls 84 and 86. The tabs 98 and 100 are swaged or otherwise enlarged to rigidly affix the release member walls 84 and 86 to the plunger 94. The central portion 96 also rests upon the release member base portion 82. The lower end 104 of plunger 94 is bifurcated to mate with a similar bifurcated housing tab 106 which is upstruck from the housing base portion 18. The mating interconnection between the bifurcated plunger lower end 104 and the bifurcated housing tab 106 restrain the plunger 94 for movement in only a vertical direction. A plunger spring 110 encircles the plunger lower end 104 and the housing tab 106 and acts upon the plunger to urge the plunger 94 and release member 80 to the normal solid line indicated position of FIGS. 1 and 2 in which the abutment faces 92 are spaced above the lock bars 46.

A handle, generally indicated at 114, is connected to the plunger upper end 116 to permit selective operation of the plunger 94 and release member 80 to a depressed condition indicated by phantom-line in FIGS. 1 and 2. A stamped sheet metal cover 118 which surrounds the retractor housing 12 has a slot 120 in the top wall thereof through which the plunger upper end 116 passes. As best seen in FIG. 2, a pair of hinge tabs 122 and 124 are upstruck from the top wall of cover 118. The handle 114, preferably of injected mold plastic, is connected to the hinge tabs 122 and 124 by hinge pins 126 and 128. The plunger upper end 116 has a slot 132 which receives a pin 134 fixedly mounted within the handle 114. The handle 114 has a normal lowered position shown in solid lines of FIG. 1 in which the plunger 94 and release member 80 are established in the normal position of FIGS. 1 and 2.

When an occupant wishes to forcibly disengage a lock bar 46 from engagement with the reels 20 and 22, the handle 114 is manually pivoted from the solid-line indicated lowered position of FIG. 1 to the phantom-line indicated raised position. Pivotal movement of the handle causes the pin 134 to move in an arcuate path designated 136 and in so doing to traverse the slot 132 and effect downward movement of the plunger 94. As best seen in FIG. 2, downward movement of the plunger 94 moves the release member 80 downwardly to the phantom-line position and in so doing causes the downwardly facing abutment faces 92 to simultaneously engage the lock bars 46 associated with both reels 20 and 22.

It is important to note that the release member abutment portions 88 are situated closely adjacent the ratchet plates 28 and 30 so that the disengaging force is applied to the lock bar 46 at the closest practical location to the point of engagement of the lock bar locking teeth 76 with the ratchet teeth 31. The disengaging force is applied to the tip of the lock bar as close as possible to the locking teeth 76 so that a reaction force is not imposed on the fulcrum provided by the pivot ears as would occur if the force were applied on the lock bar opposite the pivot ears 76. The provision of abutment portions 88 at both ends of the lock bar 46 simultaneously load both ends of the lock bars so that a torque is not applied to the lock bar as would occur if the disengaging force were applied at only one end of the lock bar. Furthermore, the lock bar release mechanism fits within the confines of the housing walls 14 and 16 by making use of the lateral spacing between the ratchet plates 28 and 30 and the adjacent housing wall as well as routing the plunger 94 through the space between the reels 20 and 22.

The phantom-line indicated raised position of the handle 114 disposes the pin 134 in a slightly overcenter position with respect to the hinge pins 126 and 128 so that the lock bar release mechanism remains in the phantom-line indicated lock bar released position until the operator intentionally lowers the handle 114.

Figure 3:
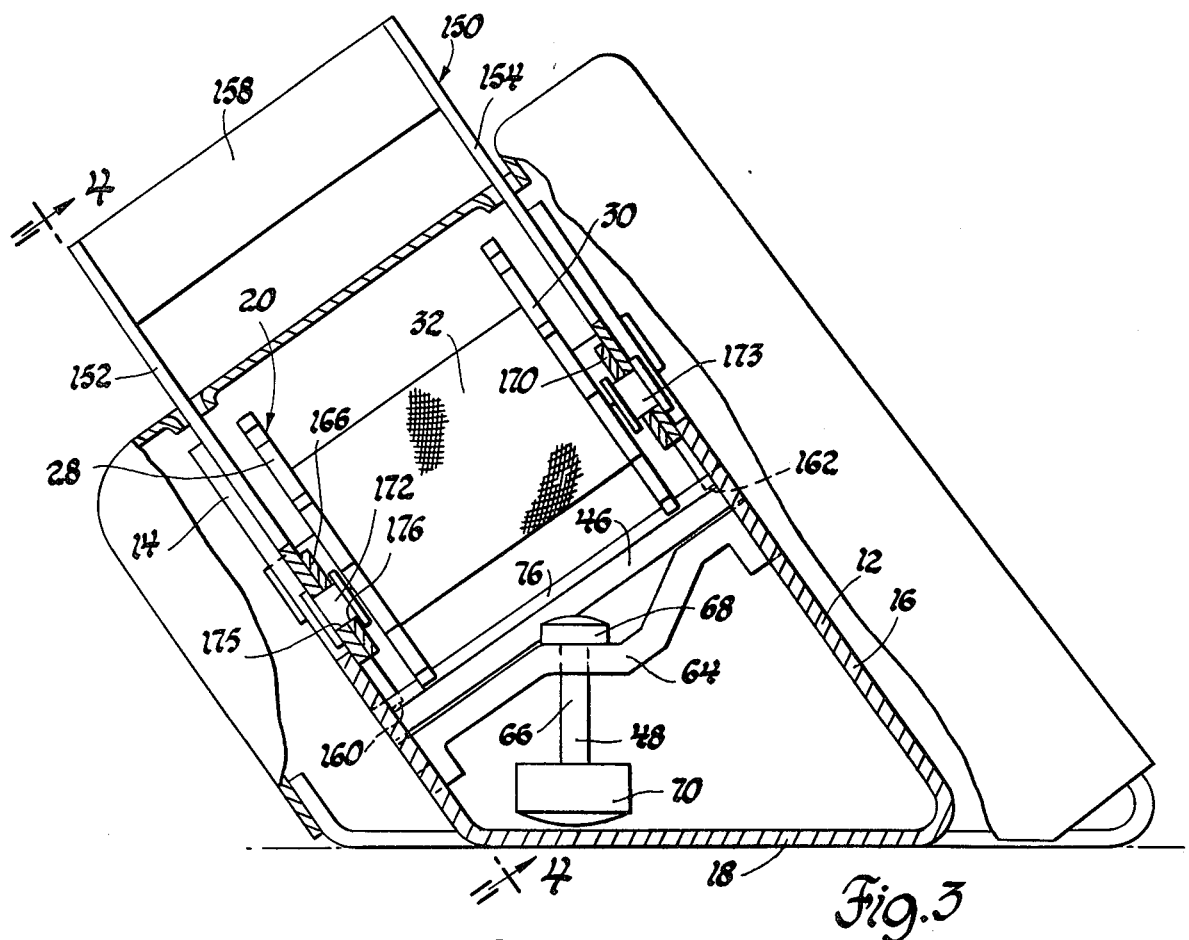
FIG. 3 is a view similar to FIG. 1 but showing a second embodiment of the invention.
Figure 4:
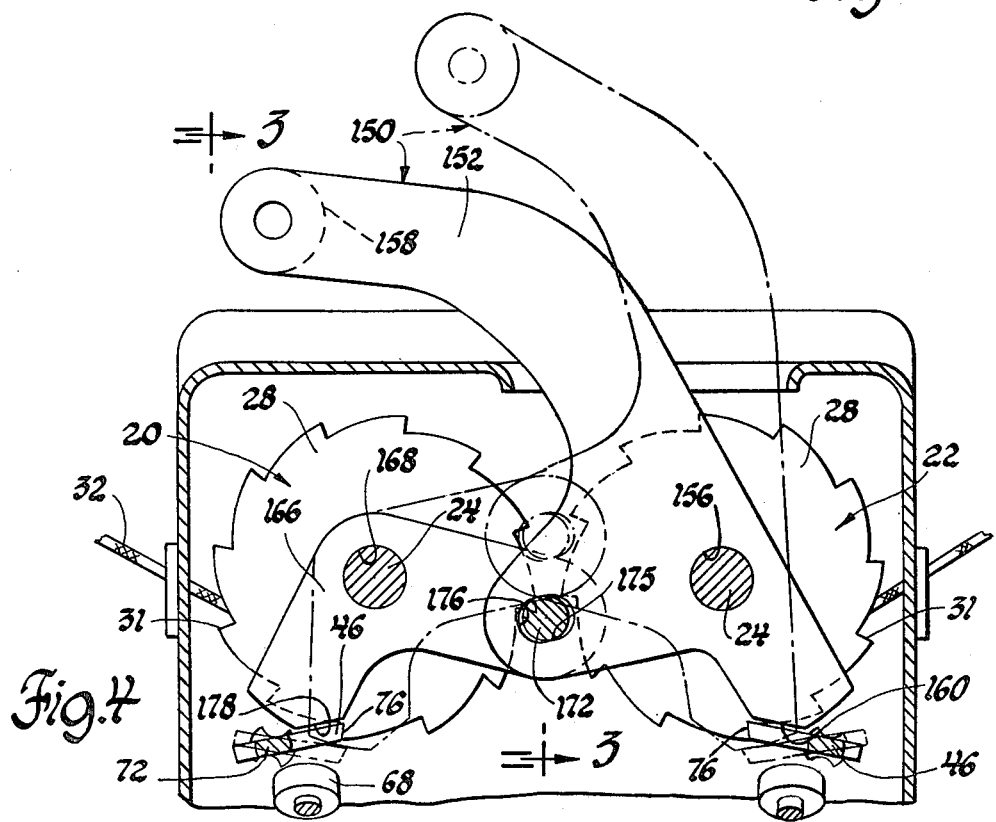
FIG. 4 is a view taken in the direction of arrows 4—4 of FIG. 3

Referring to FIGS. 3 and 4, there is shown a second embodiment of the invention. The construction of the retraction of the second embodiment is generally similar to that of the first embodiment and the like elements are designated by like reference numerals.

The lock bar release mechanism of the second embodiment includes a release handle generally indicated at 150 and having a pair of laterally spaced levers 152 and 154. The lever 152 extends through the lateral space between the ratchet plate 28 and the housing wall 14 and has a central aperture 156 which receives the reel shaft 24 to mount the lever 152 for pivotal movement. The lever 154 is similarly situated between the ratchet plate 30 and the housing wall 16 and has a like aperture which receives the reel shaft 24. The upper end of the levers 152 and 154 are connected by a hand grip 158. The lower ends of the levers 152 and 154 have cam faces 160 and 162 which overlie the locking teeth 76 of lock bar 46 closely adjacent the ratchet plates 28 and 30.

Referring to FIG. 3, a lever 166 is situated between the housing wall 14 and ratchet wheel 28 and has a central aperture 168 which receives the reel shaft 24 associated with the reel 20. A like lever 170 is interposed between the ratchet plate 30 and housing wall 16. The levers 152 and 166 are linked together by a link pin 172 which extends through a round aperture 175 of lever 152 and an elongated aperture 176 provided in the lever 166. The levers 154 and 170 are joined by a similarly arranged link pin 173. The lever 166 has a cam face 178 and lever 170 has a similar cam face, which overlie the locking teeth 76 of lock bar 46.

Referring to FIG. 4, it will be seen that the normal solid line indicated position of the levers 152 and 154 establishes the cam faces 160 and 162 in spaced relation above the lock bar 46 associated with reel 22. The levers 166 and 170 linked thereto by the link pins 172 and 173 are simultaneously established in the normal solid-line indicated position of FIG. 4 in which the cam surfaces thereof are spaced above the lock bar 46 associated with the reel 20. Accordingly, the lock bars 46 are free for movement by the pendulum assembly 48 between the engaged and disengaged position with respect to the ratchet teeth 31 of the ratchet plates 28 and 30.

If the lock bar 46 of one or both reels 20 or 22 remain in engagement with the ratchet plates, the occupant may forcibly disengage the lock bar by raising the hand grip 158 to thereby pivot the levers 152 and 154 about the reel shaft 24. The pivotal movement of the levers 152 and 154 cause the cam surfaces 160 and 162 thereof to simultaneously engage both ends of the lock bar 46 and effect its forcible downward pivotal movement out of engagement with the ratchet plates 28 and 30 of the reel 22. The link pins 172 and 173 are simultaneously raised to the phantom-line indicated position of FIG. 4 thereby pivoting the levers 166 and 170 in the counter clockwise direction so that the cam faces 178 and 179 thereof pivot the lock bar 46 of reel 20 downwardly to the disengaged position.

A subsequent lowering of the hand grip 158 to the solid line indicated position of FIG. 2 restores the levers 152, 154, 166 and 170 to the normal positions spacing their respective cam faces in space relation above the lock bars 46.

Thus it is seen that the invention provides a new and improved lock bar release mechanism.

The embodiments of the invention in which an exclusive property or privilege is claimed are defined as follows:

1. A seat belt retractor for winding an occupant restraint belt comprising:
    a housing having laterally spaced first and second walls;
    a belt reel journaled for rotation on the housing walls;
    a ratchet plate attached to each end of the reel generally adjacent the housing walls;
    a lock bar extending generally between the housing walls and journaled for rotation relative thereto, said lock bar having locking teeth adapted for selective engagement with the ratchet plates upon rotation of the lock bar toward the ratchet plates;
    a release member adapted to forcibly disengage the lock bar from engagement with the ratchet plates, said release member having laterally spaced first and second abutment portions adapted to extend between the respective ratchet plate and the adjacent housing wall to overlie the locking teeth of the lock bar in spaced relation therefrom; and
    manually actuated release means adapted to move the release member into simultaneous engagement with the latch teeth at both ends of the lock bar to forcibly disengage the lock bar from engagement with the ratchet plates whereby belt unwinding rotation of the reel is permitted.

2. A seat belt retractor for winding first and second occupant restraint belts comprising:
    a housing having laterally spaced first and second walls;
    first and second belt reels situated adjacent one another;
    first and second reel shafts acting respectively between the first and second reels and the housing walls to journal the reels for separate belt winding and unwinding rotation on the housing walls;
    a ratchet plate attached to each end of the first and second reels;
    first and second lock bars pivotally mounted on the retractor housing and associated respectively with the first and second reels, said first and second lock bars each having locking teeth aligned with the ratchet plates and selectively engageable with the ratchet plates upon pivotal movement of the lock bar toward the ratchet wheel to block belt unwinding rotation;
    a release member adapted to forcibly disengage the first and second lock bars from their respective engagement with the ratchet plates of the first and second reels, said release member having an abutment portion adapted to overlie each of the locking teeth of each of the lock bars outboard of the ratchet plates and in vertically spaced relation therefrom; and
    manually actuated release lever means adapted to forcibly move the release member toward the lock bars and carry the abutment portions into engagement with the locking teeth at both ends of each latch bar engaged with the associated ratchet plate to forcibly disengage the latch bar from engagement with the ratchet plate whereby belt unwinding rotation of the reel is permitted.

3. A seat belt retractor for winding first and second occupant restraint belts comprising:
    a housing having laterally spaced first and second walls;
    first and second belt reels;
    first and second reel shafts acting respectively between the first and second reels and the housing walls to journal the reels side-by-side for separate belt winding and unwinding rotation on the housing walls;
    ratchet plates attached to each end of the first and second reels and spaced laterally from the adjacent housing wall;
    first and second lock bars pivotally mounted on the retractor housing and associated respectively with the first and second reels, said first and second lock bars each having locking faces aligned with the ratchet plates and selectively engageable with the ratchet plates upon pivotal movement of the lock bar toward the ratchet wheel to block belt unwinding rotation;
    a release member adapted to forcibly disengage the first and second lock bars from their respective engagement with the ratchet plates of the first and second reels, said release member having abutment portions extending between each of the ratchet plates and the adjacent housing wall and overlying the locking faces of each of the lock bars in vertically spaced relation therefrom;
    a plunger member situated between the first and second reels and the housing walls and operatively connected to the release member; and
    manually actuated release handle means adapted to actuate the plunger member to forcibly move the release member toward the lock bars and carry the abutment portions into engagement with the locking faces at both ends of both lock bars engaged with the associated ratchet plates to forcibly disengage the lock bars from engagement with the ratchet plates whereby belt unwinding rotation of the reel is permitted.

* * * * *